A. E. DAVIS.
SELF DUMPING HAY SWEEP.
APPLICATION FILED SEPT. 11, 1909.
957,456.
Patented May 10, 1910.
3 SHEETS—SHEET 1.
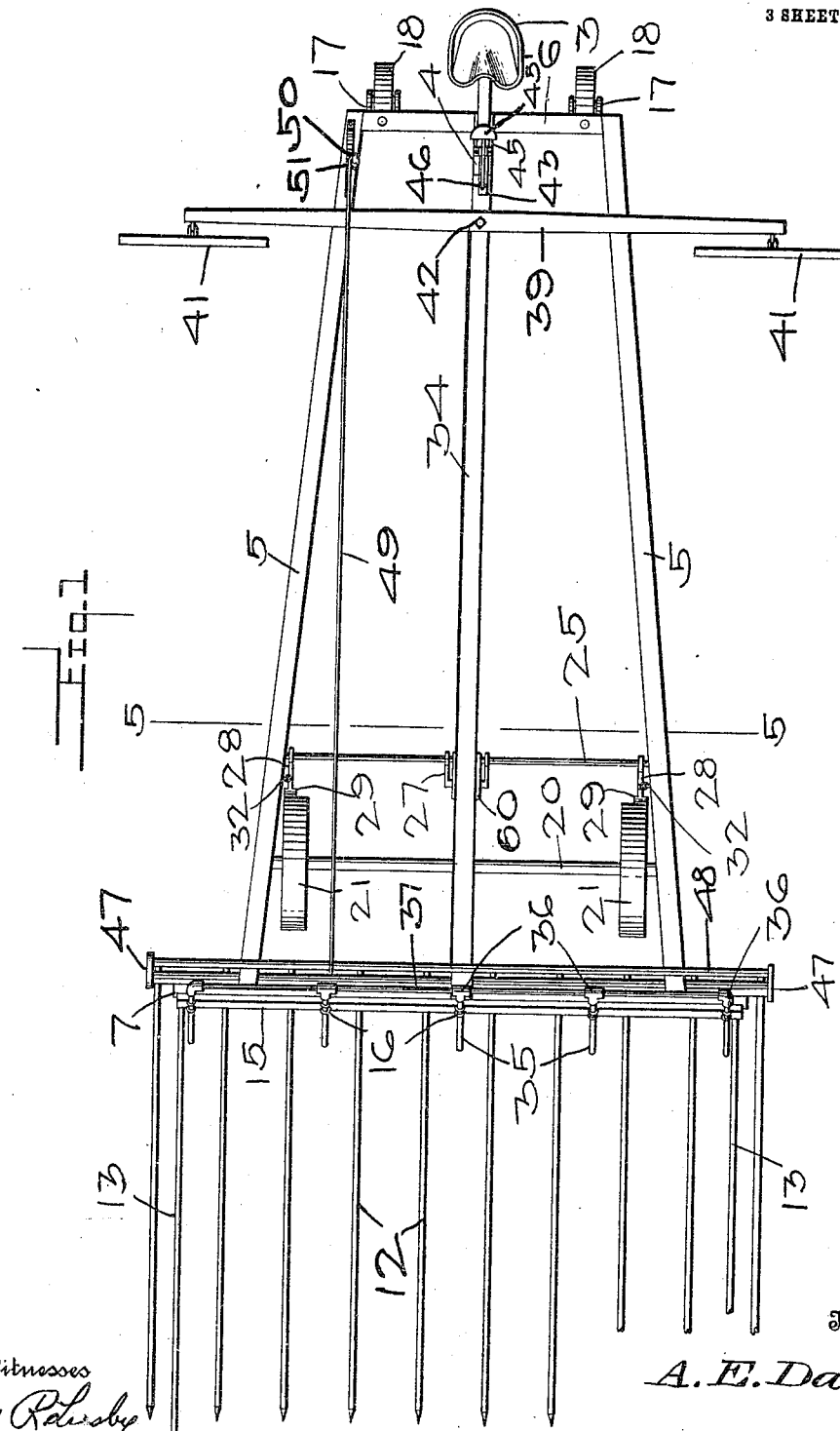

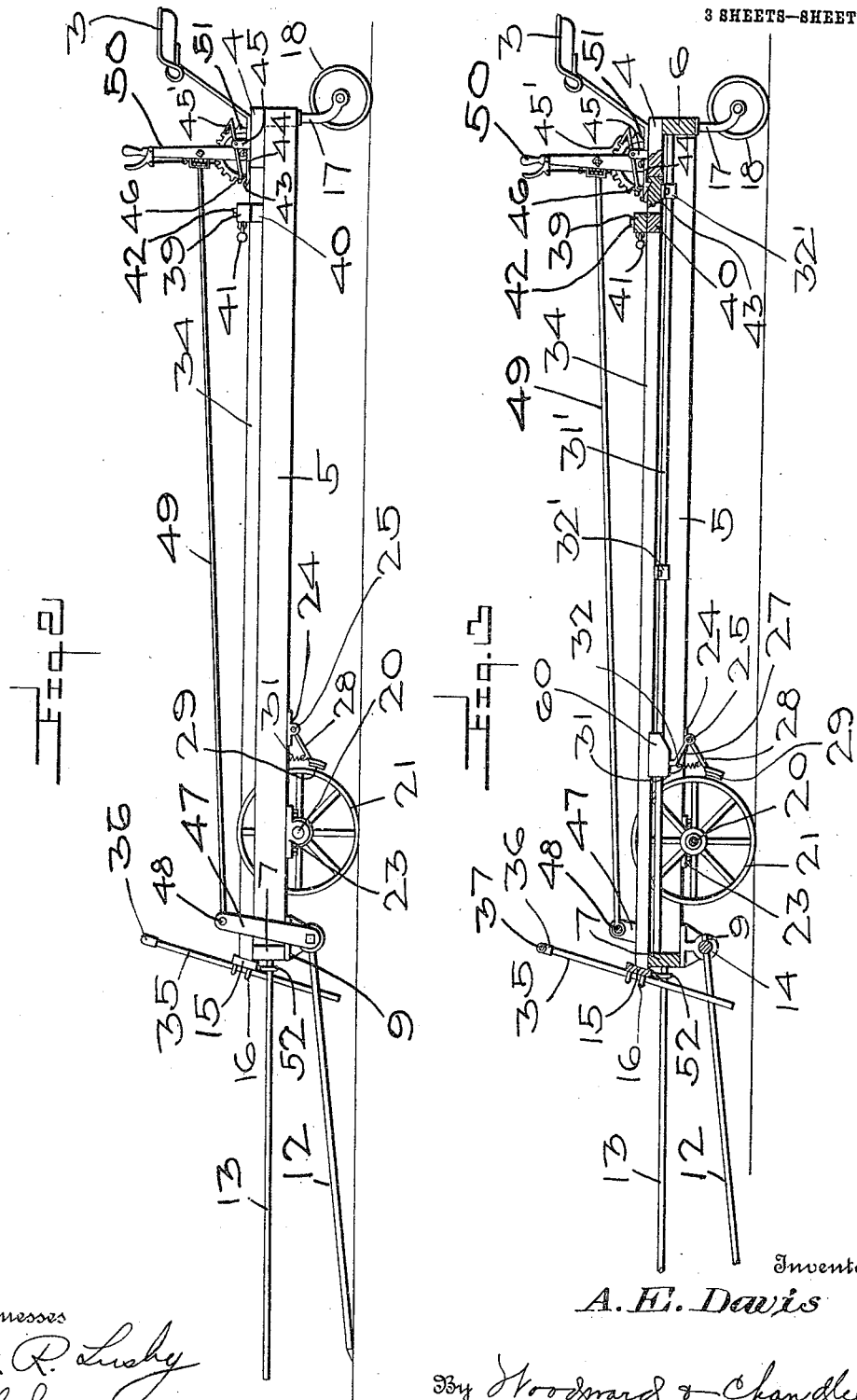

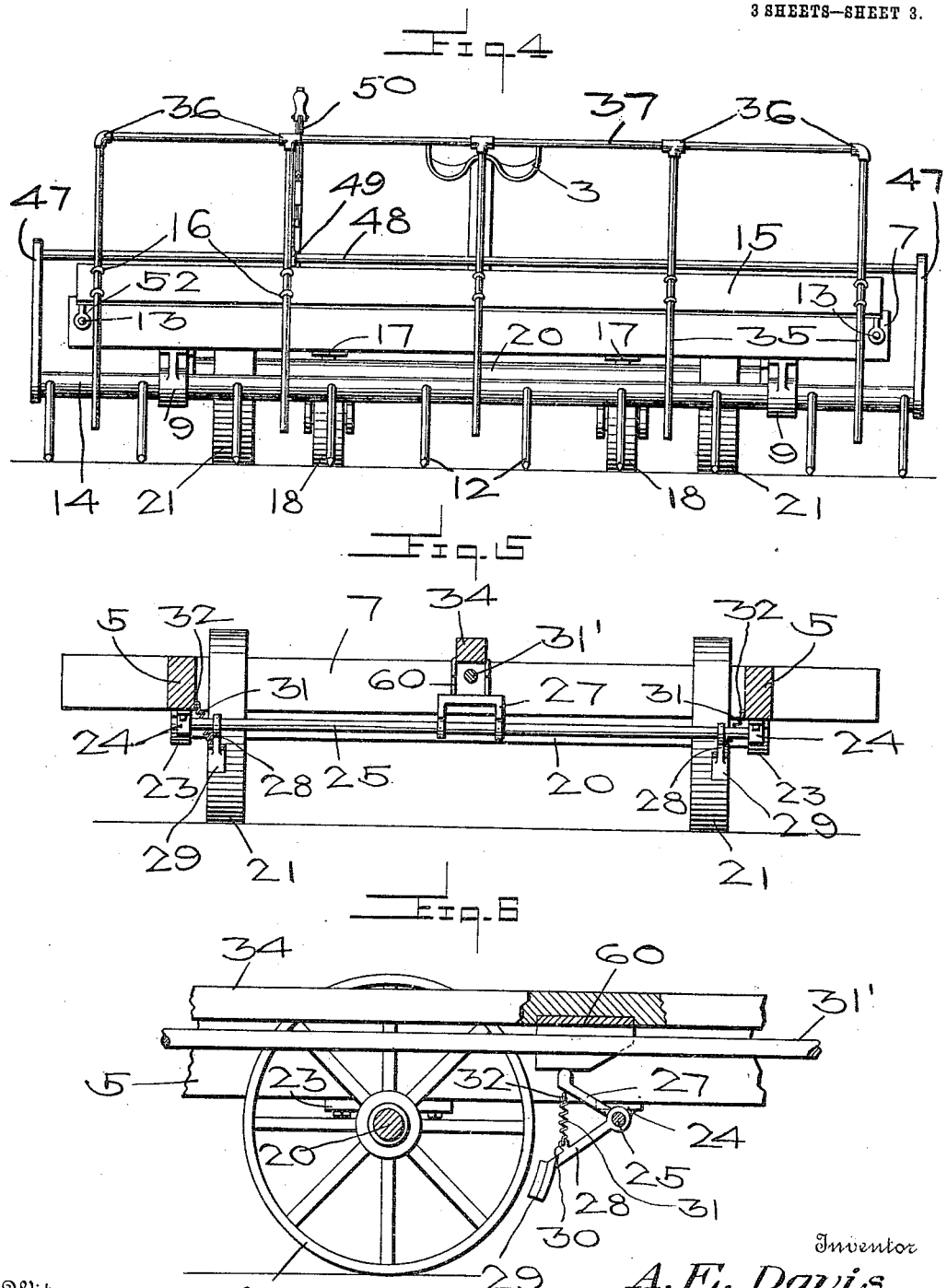

UNITED STATES PATENT OFFICE.

ALEXANDER E. DAVIS, OF BELLEVILLE, KANSAS.

SELF-DUMPING HAY-SWEEP.

957,456. Specification of Letters Patent. Patented May 10, 1910.

Application filed September 11, 1909. Serial No. 517,193.

*To all whom it may concern:*

Be it known that I, ALEXANDER E. DAVIS, a citizen of the United States, residing at Belleville, in the county of Republic and State of Kansas, have invented certain new and useful Improvements in Self-Dumping Hay-Sweeps, of which the following is a specification.

This invention relates to certain new and useful improvements in dumping hay sweeps.

The object of my invention is to provide a sweep rake so arranged that the load may be readily transferred to the fork of a suitable hay stacker.

A further object is to provide an implement arranged to be pushed over a field in the process of gathering a load, which load can be instantly discharged from the gathering fork in operating a discharge mechanism actuated by the draft animals.

With these and other objects in view, the present invention consists in the combination and arrangement of parts as will be hereinafter more fully described and particularly pointed out in the appended claims, it being understood that changes in the specific structure shown and described may be made within the scope of the claim without departing from the spirit of the invention.

In the drawings forming a part of this specification, and in which like numerals of references indicate similar parts in the several views, Figure 1 shows a top view of a dumping sweep embodying my invention. Fig. 2 is a side view thereof. Fig. 3 shows a central sectional view. Fig. 4 is a front view, Fig. 5 is a cross section on the line 5—5 of Fig. 1, Fig. 6 is a detail partly in section of the brake mechanism.

In carrying out the aim of my invention I employ a carrying frame, comprising the two similar side bars 5, the projecting front bar 7 and the rear bar 6. Held within this rear bar 6, are the caster frames 17 carrying the caster wheels 18, these caster frames being revolubly held within the bar 6.

Secured near the forward end of the frame and running parallel to the projecting frame bar 7, is the wheel shaft 20, provided with the supporting wheels 21, this shaft 20 being held within suitable bearings 23 secured to the frame members 5 as clearly disclosed in Fig. 2.

Held within the brackets 24 fastened to the frame bars 5, is the rock shaft 25 held parallel to the wheel shaft 20, this rock shaft being provided with the cam arm 27, and the shoe carrying arms 28 secured near the ends of this rock shaft, these arms 28 carrying the brake shoes 29. Each arm 28 is provided with an ear 30 from which extends a spring 31 secured to an eye 32 fastened within the frame member 5. These brake shoes 29 are arranged to be held in normal contact with the supporting wheels 21.

Extending from the forward frame member 7 to the rear frame member 6, is the guide shaft 31'. Held to this guide shaft 31' by means of the ears 32, is the push bar 34 which at its rear end is stopped against the transverse bar 4, while its forward end projects beyond the frame member 7 and carries the cross head 15 held in an oblique position, as shown in Figs. 2 and 3 and provided with the U-shaped bolts 16 carrying the grate teeth 35 which are preferably in the form of iron tubes each tube being held within a coupling member 36, these coupling members being held to the pipe sections 37 as clearly disclosed in Fig. 1.

Secured to the push bar 34, is the double tree 39 which below is provided with the bearing blocks 40 running upon the frame members 5 to prevent any vertical tilting of the doubletree. This doubletree carries the swingletrees 41. The doubletree extends beyond the frame members 5 and is carried by the king pin 42. The push bar is provided with a suitable aperture or recess arranged to receive the latch head 43 carried by the end of the spring bar 44. Extending from this spring bar are the ears 45 carrying the trunnions extending from the foot lever 45' which by means of an ear 46 is secured to the latch head 43. As shown in Fig. 3 in its retracted position, the push bar 34 is latched to the frame member 4.

Secured to the forward end of the carrying frame, are the bearing brackets 9 which carry the rake shaft 14 from which extend the rake teeth 12 secured in any suitable manner. At each end this rake shaft carries a rock arm 47, these rock arms giving support to the bar 48 from which extends the operating bar 49 secured to an ordinary lever 50 working in conjunction with the rack segment 51 as ordinarily employed in agricultural machinery, where it is desired to adjustably hold the shaft. By means of this operating lever 50, the rake teeth 12 can be raised or lowered in operating the device. Secured near each end of the forward projecting frame member 7 are the guide bars 13 which are engaged by the shackles 52 carried upon the under side of the cross head 15 as shown in Fig. 3.

The operation of my device as far as described is as follows: The sweep is pushed over the field by the draft animals to gather the hay upon the rake teeth 12, which are held at a proper angle. The load having been gathered the operator throws the lever 50 backward to raise the rake teeth 12, the load then being carried to the stack. The stack or other place of deposit having been reached, the operator depresses the lever 45' which releases the detent 43, so that as the horses are driven forward, they actuate the push bar 34 to push the load off of the fork. The load can be pushed directly upon the fork of a hay stacker, or be deposited in a wind row.

Occasionally it is found necessary to hold the carrying frames stationary while the push bar and connected grate teeth are actuated. In my present invention I provide a securing means in that the push bar 34 is provided with a cam block 60 arranged to contact with the cam arm 27 so that in the normal retracted position of the push bar, the cam block 60 is in contact with the cam arm to hold the brake shoes 29 away from the supporting wheels 21. However, as soon as the push bar is carried forward, the cam block 60 slides off of the cam arm so that the shoe carrying arms 28 are carried upward by means of the connected springs 31, insuring the brake shoes 29 firmly contacting with the supporting wheels. By this means upon the operation of the push bar the supporting wheels are automatically locked.

The implement is simple and inexpensive in construction and both durable and efficient in operation and the adjustments can be easily effected by the operator carried upon the seat 3.

What is claimed is:

1. In a device of the character described, the combination with a wheel supported carrying frame, of a longitudinally positioned guide shaft carried by said frame, a detent carried by said frame, a push bar supported by said frame and guided by said shaft, a cam block secured to said push bar, a cross head carried at the forward end of said push bar, a grate carried by said head, a rake shaft, teeth projecting from said rake shaft, means to adjustably hold said rake shaft, said detent engaging said push bar, a rock shaft having shoe arms, and a cam arm secured to said rock shaft and engaged by said cam block.

2. In a device of the character described, the combination with a wheel supported carrying frame, of a guide shaft secured to said frame, a detent carried by said frame, means to operate said detent, a push bar supported by said frame and guided by said shaft, a cam block secured to said push bar, a cross head carried at the forward end of said push bar, a grate carried by said head, a rake shaft, teeth projecting from said rake shaft, means to adjustably hold said rake shaft, said detent engaging said push bar, a rock shaft having shoe arms, and a cam arm secured to said rock shaft and engaged by said cam block.

3. In combination a wheel supported frame, of a guide shaft carried by said frame, a detent secured to said frame, a push bar supported by said frame and guided by said shaft, a cam block secured to said push bar, a grate carried at the end of said push bar, a rake secured to said frame, means to adjustably hold said rake, a rock shaft having shoe arms, springs to normally force said arms in one direction, and a cam arm secured to said rock shaft and engaged by said cam block.

4. In combination, a wheel supported frame, a guide shaft carried by said frame, a detent carried by said frame, a push bar supported by said frame and guided by said shaft, a grate secured to the end of said push bar, a rake carried at the forward end of said frame, means to adjust said rake, said detent engaging said push bar, a rock shaft having shoe arms, a cam arm secured to said rock shaft and engaged by said cam block, and means to actuate said push bar.

5. In combination, a wheel supported frame, a guide shaft carried by said frame, a push bar guided by said shaft, a detent engaging said push bar, means to actuate said push bar, a cam block secured to said push bar, a grate carried by said push bar, a rake secured to the forward end of said frame, means to adjustably secure said rake, a rock shaft having shoe arms engaging the wheels of said frame, and a cam arm secured to said rock shaft and engaged by said cam block.

In testimony whereof I affix my signature, in presence of two witnesses.

ALEXANDER E. DAVIS.

Witnesses:
WILLIAM PETTYJOHN,
CHARLEY NUTTER.